US012666364B2

(12) United States Patent
Chen et al.

(10) Patent No.: US 12,666,364 B2
(45) Date of Patent: Jun. 23, 2026

(54) VoLTE/VoNR PERFORMANCE OPTIMIZATION FOR A CELLULAR COMMUNICATION SYSTEM

(71) Applicant: Samsung Electronics Co., Ltd., Suwon-si (KR)

(72) Inventors: Hao Chen, Plano, TX (US); Lianjun Li, McKinney, TX (US); Yan Xin, Princeton, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 442 days.

(21) Appl. No.: 17/813,912

(22) Filed: Jul. 20, 2022

(65) Prior Publication Data

US 2023/0036744 A1 Feb. 2, 2023

Related U.S. Application Data

(60) Provisional application No. 63/227,749, filed on Jul. 30, 2021.

(51) Int. Cl.
| | |
|---|---|
| *H04W 52/14* | (2009.01) |
| *H04W 52/08* | (2009.01) |
| *H04W 52/24* | (2009.01) |

(52) U.S. Cl.
CPC ......... *H04W 52/146* (2013.01); *H04W 52/08* (2013.01); *H04W 52/241* (2013.01); *H04W 52/242* (2013.01)

(58) Field of Classification Search
CPC ......... H04W 52/00–60; H04W 52/146; H04W 52/08; H04W 52/241; H04W 52/242
See application file for complete search history.

(56) References Cited

U.S. PATENT DOCUMENTS

| | | |
|---|---|---|
| 9,363,780 B2 | 6/2016 | Yang et al. |
| 10,341,961 B2 | 7/2019 | Cheng |

(Continued)

FOREIGN PATENT DOCUMENTS

KR 10-2014-0038557 A 3/2014

OTHER PUBLICATIONS

Neto et al., "Uplink Power Control Framework Based on Reinforcement Learning for 5G Networks", Jun. 2021, IEEE Transactions on Vehicular Technology, vol. 70, No. 6, (Year: 2021).*
"5G; NR; Physical channels and modulation (3GPP TS 38.211 version 16.4.0 Release 16)", ETSI TS 138 211 V16.4.0, Jan. 2021, 137 pages.
"5G; NR; Multiplexing and channel coding (3GPP TS 38.212 version 16.4.0 Release 16)", ETSI TS 138 212 V16.4.0, Jan. 2021, 155 pages.

(Continued)

*Primary Examiner* — Raymond S Dean

(57) ABSTRACT

Methods and apparatuses for voice over long-term evolution/voice over new radio (VoLTE/VoNR) performance for a cellular communication system. A method of operating a base station includes receiving, from a user equipment (UE), uplink (UL) signals; identifying, based on the UL signals, a first and second parameters; determining first and second UL power control parameters based on the first and second parameters, respectively; determining a first time period for the first UL power control parameter and a second time period for the second UL power control parameter, wherein the first time period is longer than the second time period; updating the first UL power control parameter based on the first time period and the second UL power control parameter based on the second time period; and transmitting, to the UE, the updated first and second UL power control parameters for an UL transmit power of the UE.

20 Claims, 11 Drawing Sheets

(56) References Cited

U.S. PATENT DOCUMENTS

| | | | |
|---|---|---|---|
| 10,938,519 B2 | 3/2021 | Huang et al. | |
| 2009/0109868 A1* | 4/2009 | Chen | H04L 41/12 |
| | | | 370/254 |
| 2009/0181687 A1* | 7/2009 | Tiirola | H04L 5/0048 |
| | | | 455/507 |
| 2013/0202303 A1* | 8/2013 | Wilkinson | H04L 27/3818 |
| | | | 398/76 |
| 2014/0133448 A1 | 5/2014 | Xu et al. | |
| 2014/0241197 A1 | 8/2014 | Baldemair et al. | |
| 2018/0359711 A1* | 12/2018 | Akkarakaran | H04W 52/325 |
| 2019/0132033 A1* | 5/2019 | Akkarakaran | H04W 52/42 |
| 2019/0159136 A1* | 5/2019 | MolavianJazi | H04W 52/362 |
| 2022/0345907 A1* | 10/2022 | Yu | H04B 7/0617 |
| 2023/0011479 A1* | 1/2023 | Saha | H04W 72/1268 |

OTHER PUBLICATIONS

"5G; NR; Physical layer procedures for control (3GPP TS 38.213 version 16.4.0 Release 16)", ETSI TS 138 213 V16.4.0, Jan. 2021, 185 pages.

"5G; NR; Physical layer procedures for data (3GPP TS 38.214 version 16.4.0 Release 16)", ETSI TS 138 214 V16.4.0, Jan. 2021, 173 pages.

"5G; NR; Medium Access Control (MAC) protocol specification (3GPP TS 38.321 version 16.3.0 Release 16)", ETSI TS 138 321 V16.3.0, Jan. 2021, 158 pages.

"5G; NR; Radio Resource Control (RRC); Protocol specification (3GPP TS 38.331 version 16.3.1 Release 16)", ETSI TS 138 331 V16.3.1, Jan. 2021, 916 pages.

* cited by examiner

VoLTE/VoNR PERFORMANCE OPTIMIZATION FOR A CELLULAR COMMUNICATION SYSTEM

CROSS-REFERENCE TO RELATED APPLICATIONS AND CLAIM OF PRIORITY

The present application claims priority to U.S. Provisional Patent Application No. 63/227,749, filed on Jul. 30, 2021. The content of the above-identified patent documents are incorporated herein by reference.

TECHNICAL FIELD

The present disclosure relates generally to wireless communication systems and, more specifically, the present disclosure relates to a voice over long-term evolution/voice over new radio (VoLTE/VoNR) performance for a cellular communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to VoLTE/VoNR performance improvement for cellular communication system.

In one embodiment, a base station (BS) in a wireless communication system is provided. The BS comprises a transceiver configured to receive, from a user equipment (UE), uplink (UL) signals. The BS further comprises a processor operably coupled to the transceiver, the processor configured to identify, based on the UL signals, a first and second parameters, determine first and second UL power control parameters based on the first and second parameters, respectively, determine a first time period for the first UL power control parameter and a second time period for the second UL power control parameter, wherein the first time period is longer than the second time period, and update the first UL power control parameter based on the first time period and the second UL power control parameter based on the second time period, wherein the transceiver of the BS is further configured to transmit, to the UE, the updated first and second UL power control parameters for an UL transmit power of the UE.

In another embodiment, a method of BS in a wireless communication system is provided. The method comprises: receiving, from a UE, UL signals; identifying, based on the UL signals, a first and second parameters; determining first and second UL power control parameters based on the first and second parameters, respectively; determining a first time period for the first UL power control parameter and a second time period for the second UL power control parameter, wherein the first time period is longer than the second time period; updating the first UL power control parameter based on the first time period and the second UL power control parameter based on the second time period; and transmitting, to the UE, the updated first and second UL power control parameters for an UL transmit power of the UE.

In yet another embodiment, a non-transitory computer-readable medium comprising program code is provided. The non-transitory computer-readable medium comprising program code, that when executed by at least one processor, causes an electronic device to: identify, based on UL signals, a first and second parameters; determine first and second UL power control parameters based on the first and second parameters, respectively; determine a first time period for the first UL power control parameter and a second time period for the second UL power control parameter, wherein the first time period is longer than the second time period; update the first UL power control parameter based on the first time period and the second UL power control parameter based on the second time period; and transmit, to the UE, the updated first and second UL power control parameters for an UL transmit power of the UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.4.0, "NR; Physical channels and modulation"; 3GPP TS 38.212 v16.4.0, "NR; Multiplexing and Channel coding"; 3GPP TS 38.213 v16.4.0, "NR; Physical Layer Procedures for Control"; 3GPP TS 38.214 v16.4.0, "NR; Physical Layer Procedures for Data";

3GPP TS 38.321 v16.3.0, "NR; Medium Access Control (MAC) protocol specification"; and 3GPP TS 38.331 v16.3.1, "NR; Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
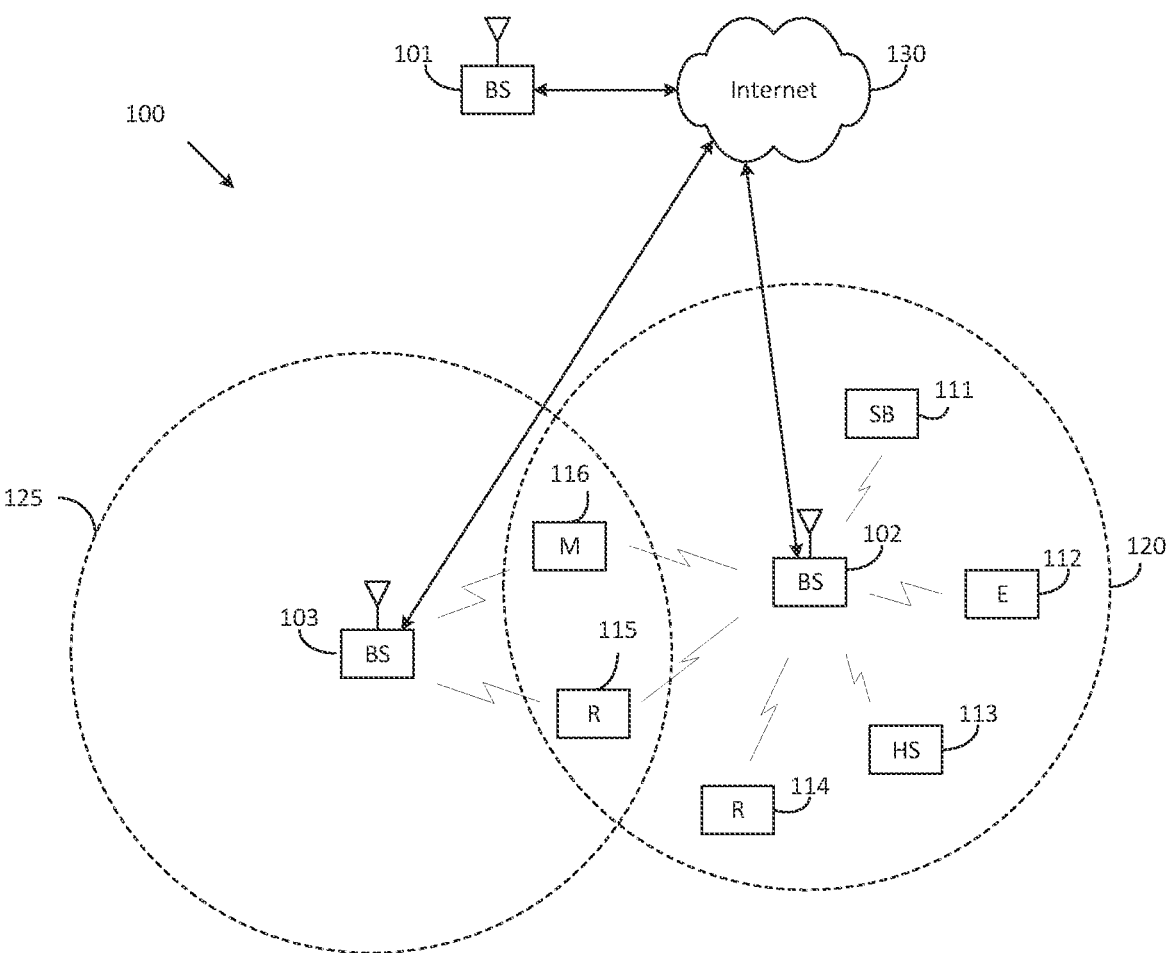
FIG. 1 illustrates an example of wireless network according to embodiments of the present disclosure.
Figure 2:
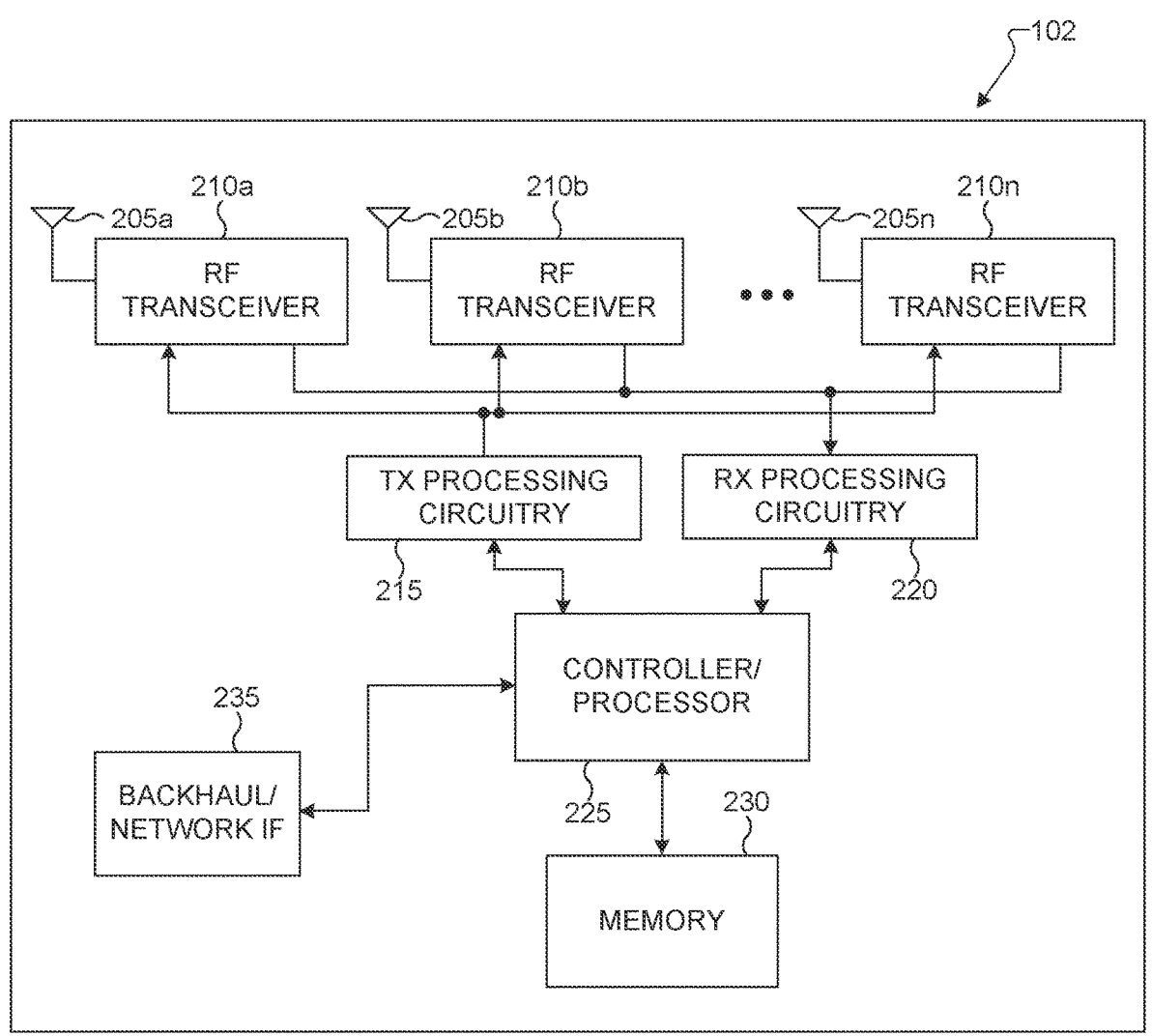
FIG. 2 illustrates an example of gNB according to embodiments of the present disclosure.
Figure 3:
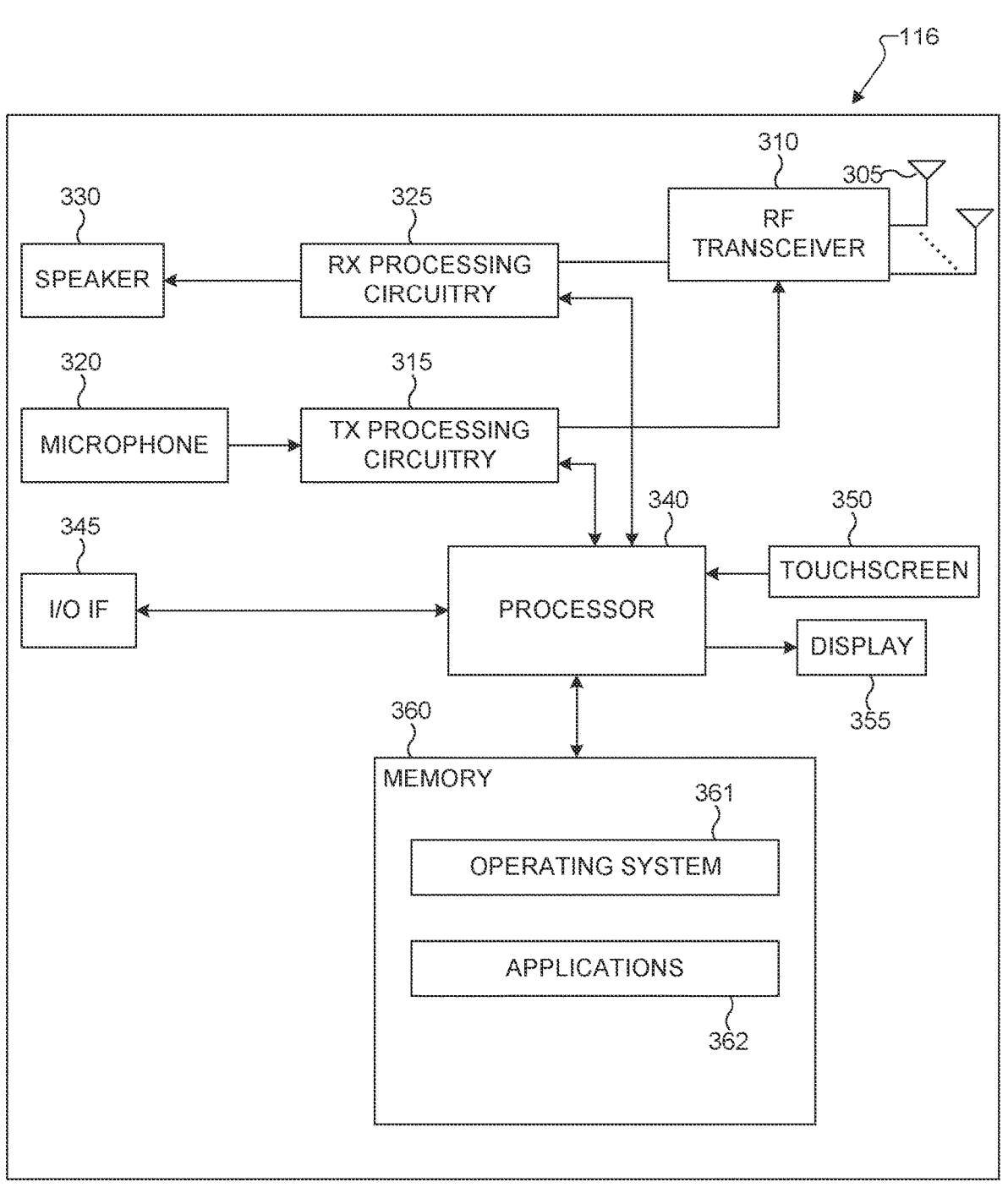
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for VoLTE/VoNR performance improvement for cellular communication system. In certain embodiments, and one or more of the gNBs 101-103 includes circuitry, programing, or a combination thereof, for VoLTE/VoNR performance improvement for cellular communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support VoLTE/VoNR performance improvement for cellular communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for VoLTE/VoNR performance improvement for cellular communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figures 4, 5:
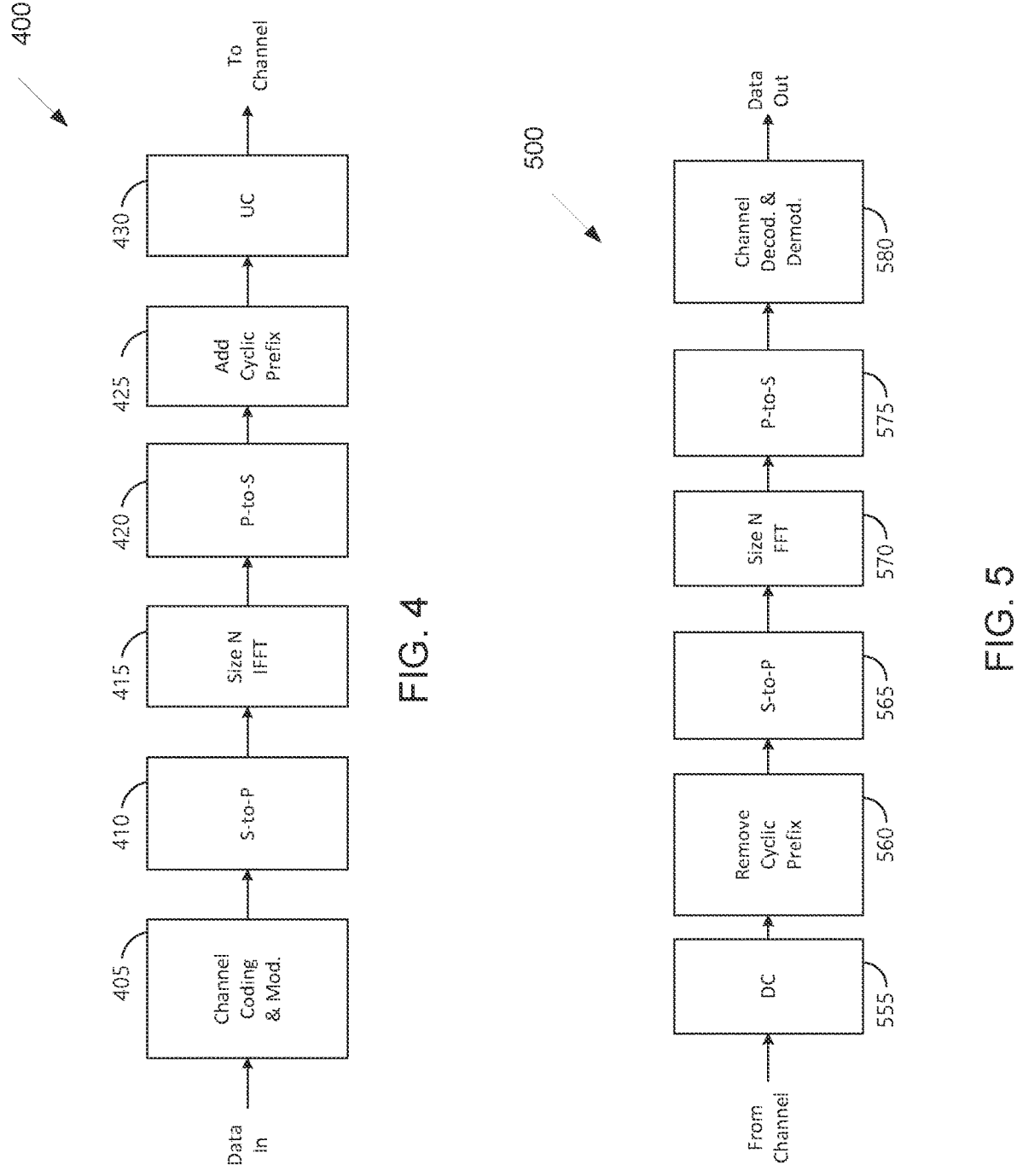
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6.

Figure 6:
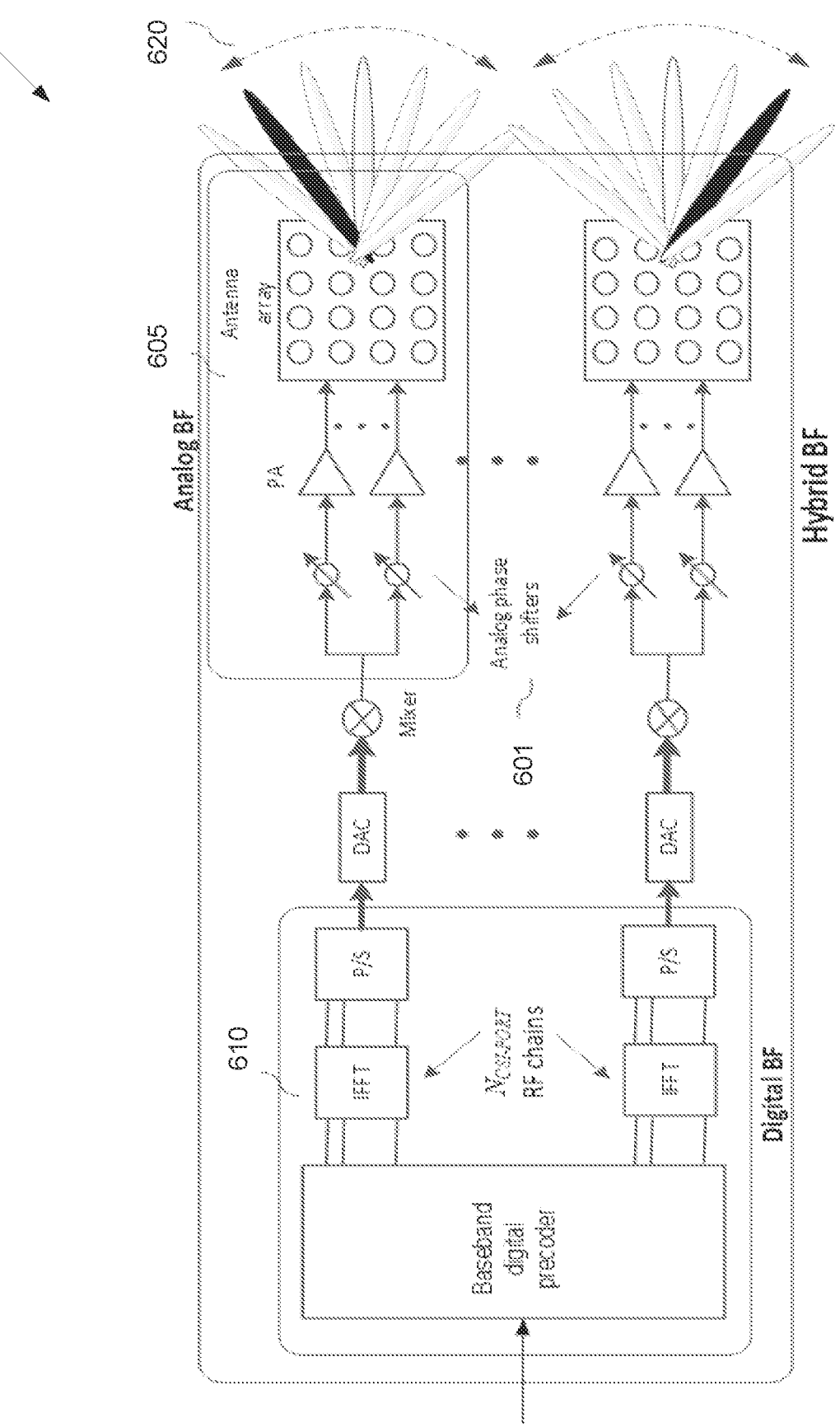
FIG. 6 illustrates an example of antenna structure according to embodiments of the present disclosure.

FIG. 6 illustrates an example antenna structure 600 according to embodiments of the present disclosure. An embodiment of the antenna structure 600 shown in FIG. 6 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

Different from traditional communications networks that have separated data-packet and circuit-switching subnetworks, LTE and NR network was designed and launched as full IP-based data-packet network. Therefore, voice communications, a critical service and major revenue generator, has been moved to utilize LTE/NR data network to control and carry voice calls as IP packets, named VoLTE/VoNR. However, because voice services have more stringent latency and connectivity requirement than data services, optimization is needed to guarantee the quality of service (QoS) of VoLTE/VoNR.

VoLTE/VoNR usually suffers from the uplink coverage holes due to the uplink-downlink transmission power imbalance in LTE/NR networks. Therefore, uplink power control in an effective way to improve the VoLTE/VoNR performance. In the present disclosure, for PUSCH channel power control, following equation is provided: $P_{PUSCH}(i)=min\{P_{CMAX}, 10 \ log_{10}(M_{PUSCH}(i))+P_{O\_PUSCH}+ \alpha \cdot PL+\Delta_{TF}(i)+f(i)\}$ [dBm], where $P_{PUSCH}$ is the uplink transmission power of the UE; i is sub-frame number; $P_{CMAX}$ is the max power; $M_{PUSCH}$ is number of RBs assigned to the UE; $P_{O\_PUSCH}$ represents the eNodeB or gNB received power per Resource Block assuming a path loss of 0 dB; $\alpha$ is used to configure the use of fractional power control; PL is the pathloss; $\Delta_{TF}$ depends on the modulation and coding scheme selected by UE; $f$ is the close loop portion of the power control.

The present disclosure provides methods for enhancing the VoLTE/VoNR performance by two level optimization of power control.

In one example, the method provides an optimization for the long term power control parameters.

In one example, the method provides an optimization for the long term power control parameter and short-term per frame level power control In on embodiment, an eNB/gNB collects one or more long term parameters (e.g., RSRP, SINR, throughput, etc.) measured from user equipment (UE) and one or more short-term parameters (e.g., RI, PMI, CQI, SRS, etc.) and jointly determining one or more long term power control parameters (e.g., PO_PUSCH, $\alpha$, etc.) and one or more short term power control parameter (e.g., f(i), etc.).

In one embodiment, an eNB/gNB updates the one or more long term power control parameters over a first period (e.g., every T seconds) and the one or more short term power control parameters over a second period (e.g., every Y milli-seconds).

In one embodiment, an eNB/gNB hierarchically control the power control parameters based on utilizing at least one deep learning module to control the one or more long term power control parameters and the one or more short term power control parameters.

In one embodiment of the present disclosure, an eNB/gNB collects the long term parameters measured from UE including reference signal reference power (RSRP), signal to interference noise ratio (SINR), throughput etc. and short-term parameters including a rank indicator (RI), precoding matrix indicator (PMI), channel quality indicator (CQI), sounding reference signal (SRS) etc. and then decide the long term power control parameters $P_{O\_PUSCH}$, $\alpha$, as well as short term power control parameter $f(i)$ jointly.

Figure 7:
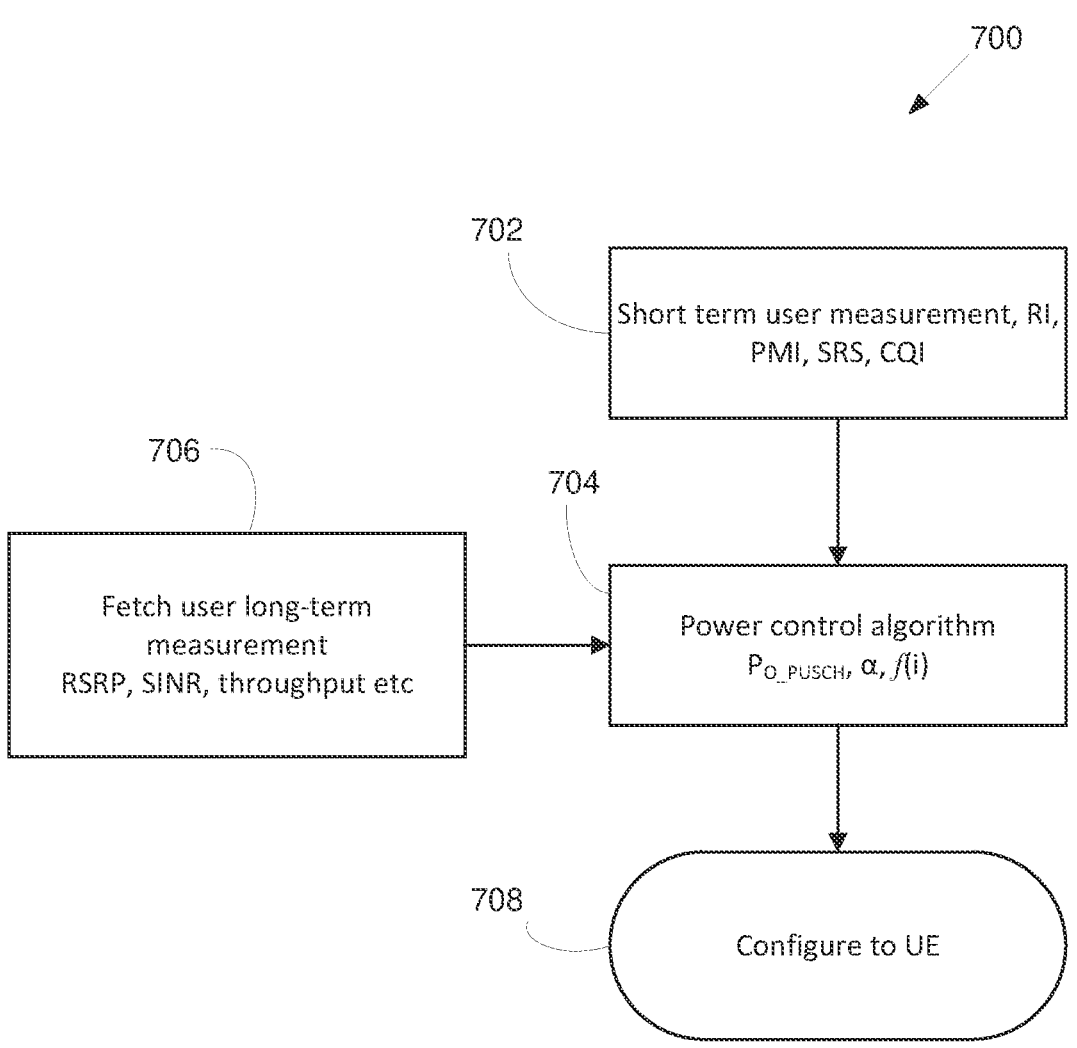
FIG. 7 illustrates an example of power control block according to embodiments of the present disclosure.

FIG. 7 illustrates an example of power control block 700 according to embodiments of the present disclosure. An embodiment of the power control block 700 shown in FIG. 7 is for illustration only.

In one embodiment, an eNB/gNB updates long term power control parameters $P_{O\_PUSCH}$, $\alpha$ every T seconds, and controls short term power control parameter $f(i)$ every Y milli-seconds.

As illustrated in FIG. 7, the power control block 700 includes a short term user measurement block 702, a fetch user ling term measurement block 706, a power control algorithm block 705, and a UE configuration block. The power control algorithm block 704 receives the output from the block 702 and the block 706, and send the output to the block 708.

Figure 8:
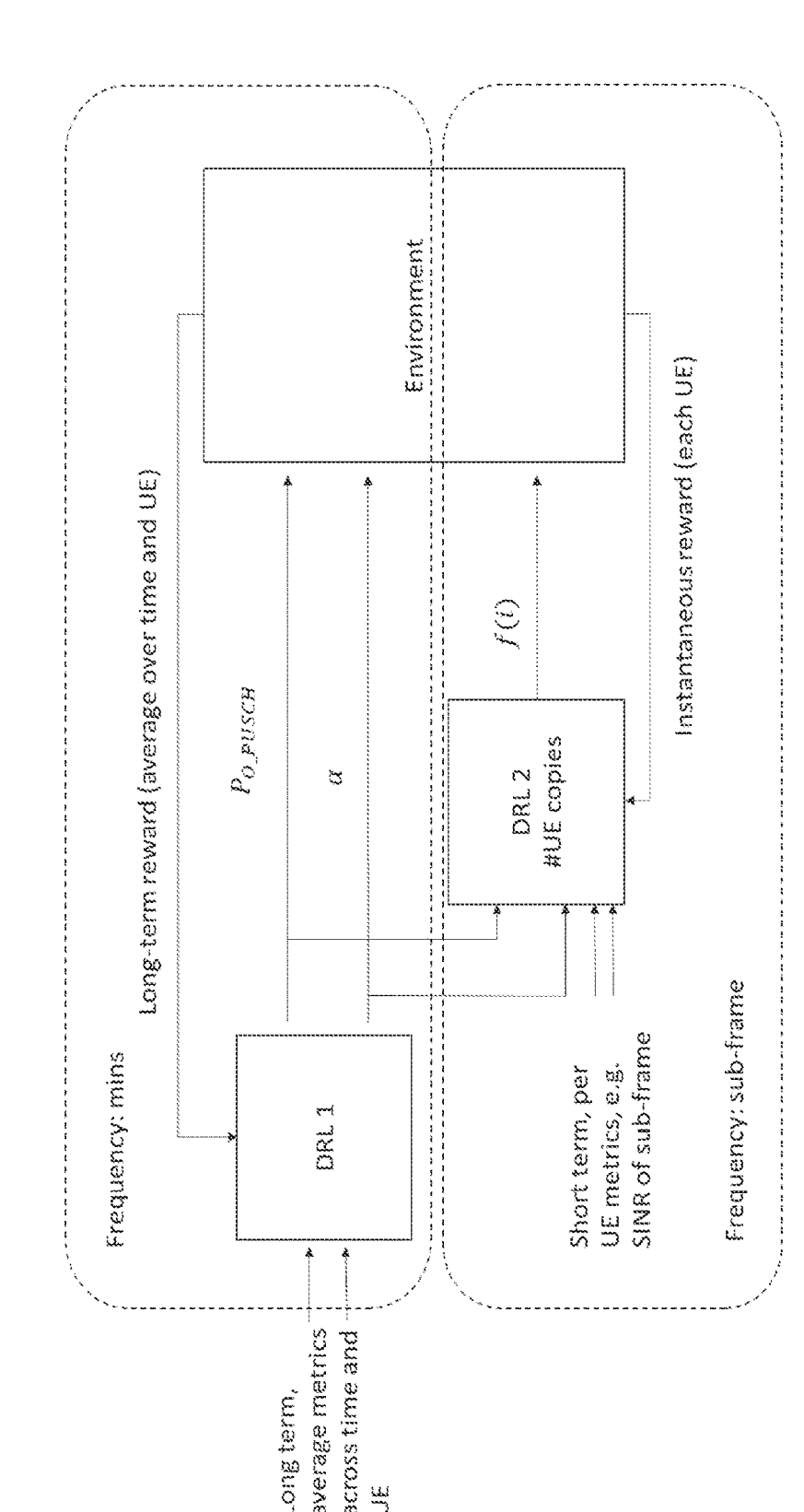
FIG. 8 illustrates an example of DRL based hierarchical power control according to embodiments of the present disclosure.

In one embodiment, an eNB/gNB controls these power control parameters hierarchically where one deep learning module is used to control $P_{O\_PUSCH}$, $\alpha$ and another deep learning module is to control short term parameters f(1) as shown in FIG. 8.

FIG. 8 illustrates an example of DRL based hierarchical power control 800 according to embodiments of the present disclosure. An embodiment of the DRL based hierarchical power control 800 shown in FIG. 8 is for illustration only.

In one embodiment, an algorithm tries to optimize cell-specific, long-term power control parameters $P_{O\_PUSCH}$ and $\alpha$. Within a trial period of N mins, the algorithm explores one set of parameters per day, and receives the corresponding network key performance indicators (KPIs). At the end of the trail, an algorithm reports the parameter setting that achieves the highest objective function value. While exploration, the algorithm also needs to avoid selecting parameters that heavily degrade network KPIs.

In one embodiment, an objective function is provided as shown:

$$O = \frac{MOS_{avg}}{C_{MOS}} - Rate_{rej} + \frac{UL\_SINR_{avg}}{C_{SINR}},$$

where $MOS_{avg}$ average MOS value for all VoLTE users; $C_{MOS}$ is a normalization factor for MOS; $Rate_{rej}$ is the VoLTE rejection rate; $UL\_SINR_{avg}$ is the average uplink SINR for all VoLTE users; $C_{SINR}$ is a normalization factor for SINR.

In one embodiment, two types of algorithms are developed, one is greedy and simulated annealing (Greedy-SA)-based, another is Nelder-Mead (NM)-based algorithm.

Figure 9:
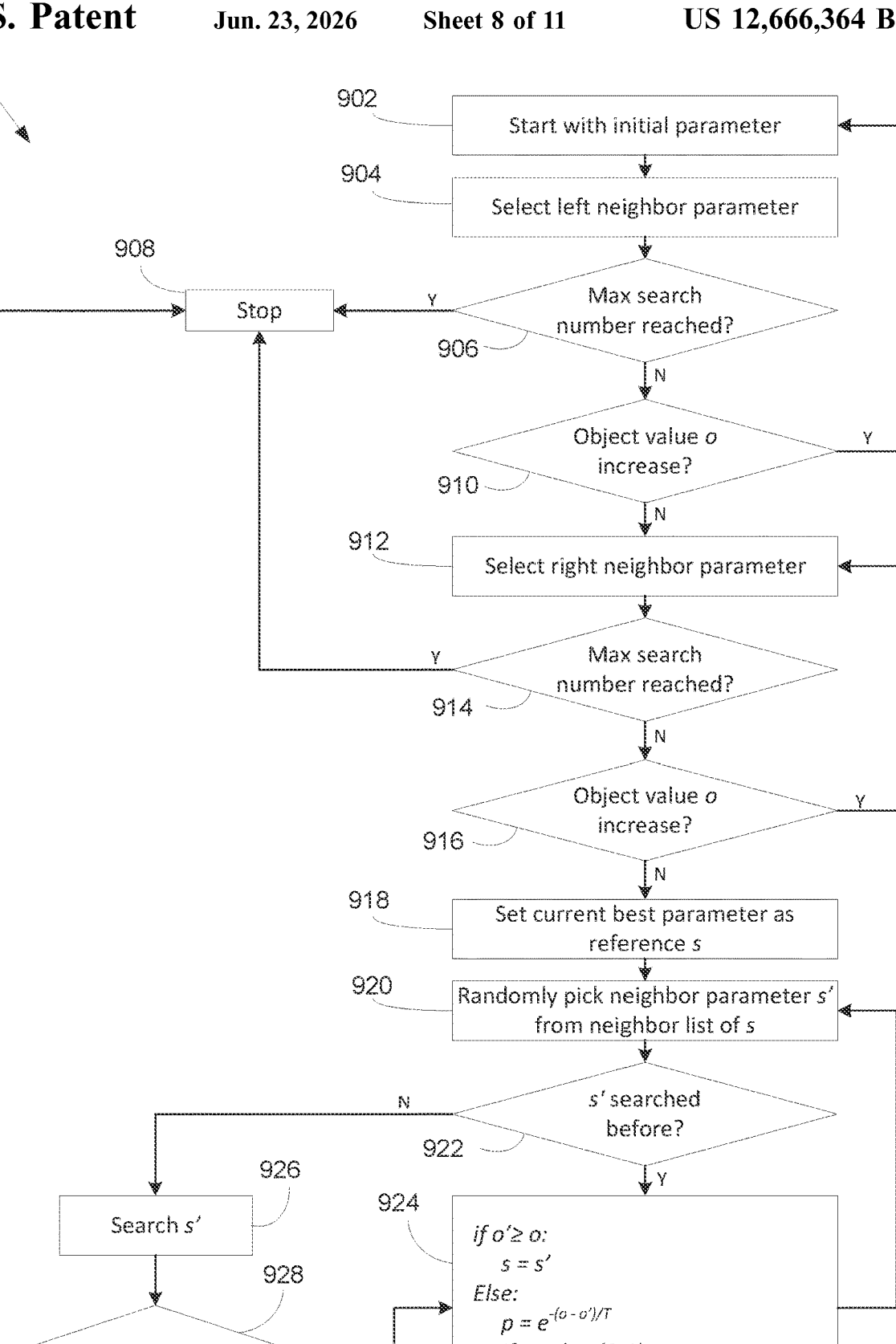
FIG. 9 illustrates a flowchart of method for SA algorithm for power control according to embodiments of the present disclosure.

Greedy-SA-based algorithm is depicted in FIG. 9, where each parameter is searched in a sequential manner following the greedy SA rule.

FIG. 9 illustrates a flowchart of method 900 for SA algorithm for power control according to embodiments of the present disclosure. The method 900 as may be performed by BS (e.g., 101-103 as illustrated in FIG. 1). An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

Figure 10:
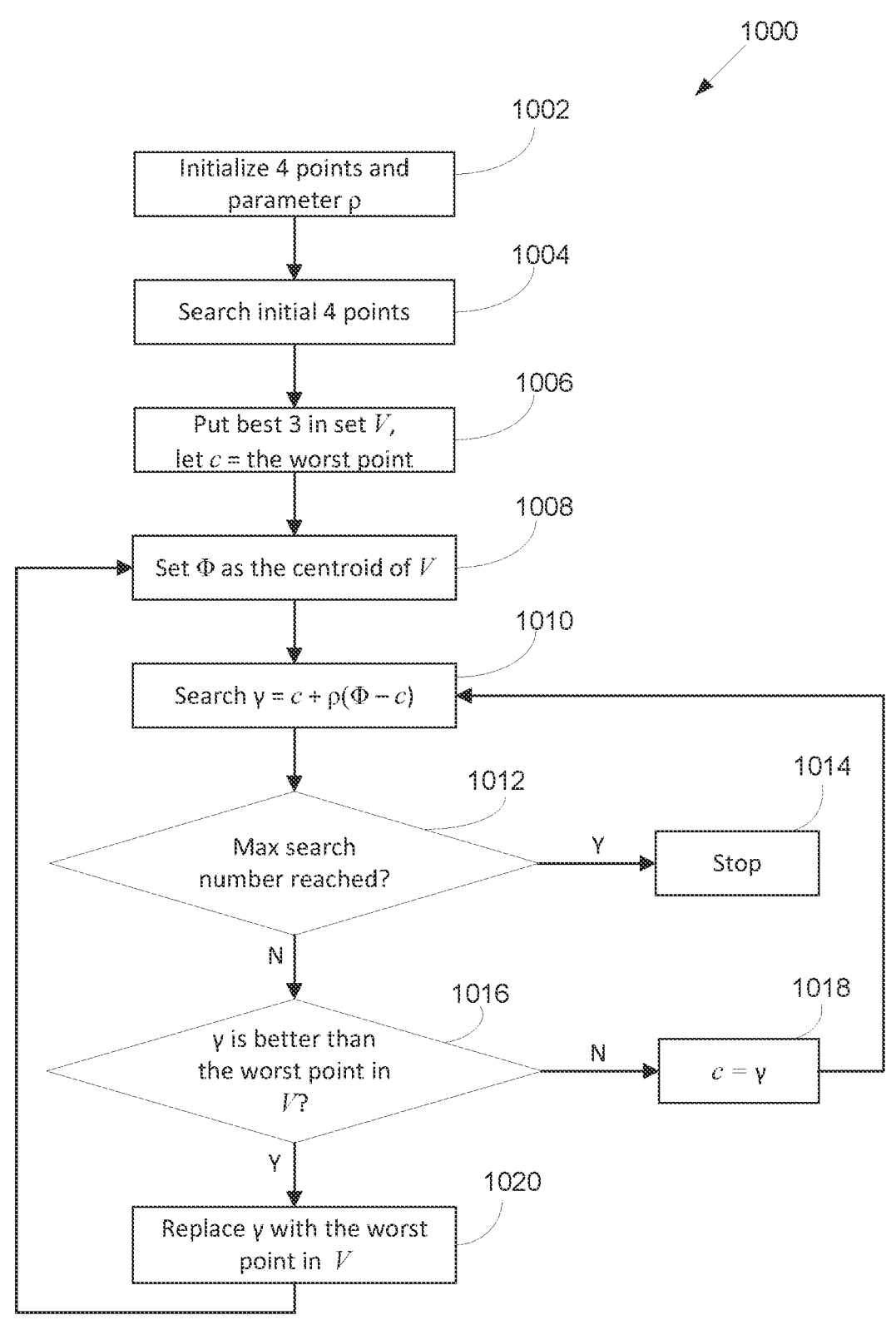
FIG. 10 illustrates a flowchart of method for NM algorithm based power control according to embodiments of the present disclosure.

In one embodiment, the NM-based algorithm that may be a simplex search algorithm is used where all parameters are jointly searched from the boundary points towards inside of the parameter space, the procedure is explained in FIG. 10.

FIG. 10 illustrates a flowchart of method 1000 for NM algorithm based power control according to embodiments of the present disclosure. The method 1000 as may be performed by a BS (e.g., 101-103 as illustrated in FIG. 1). An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

Figure 11:
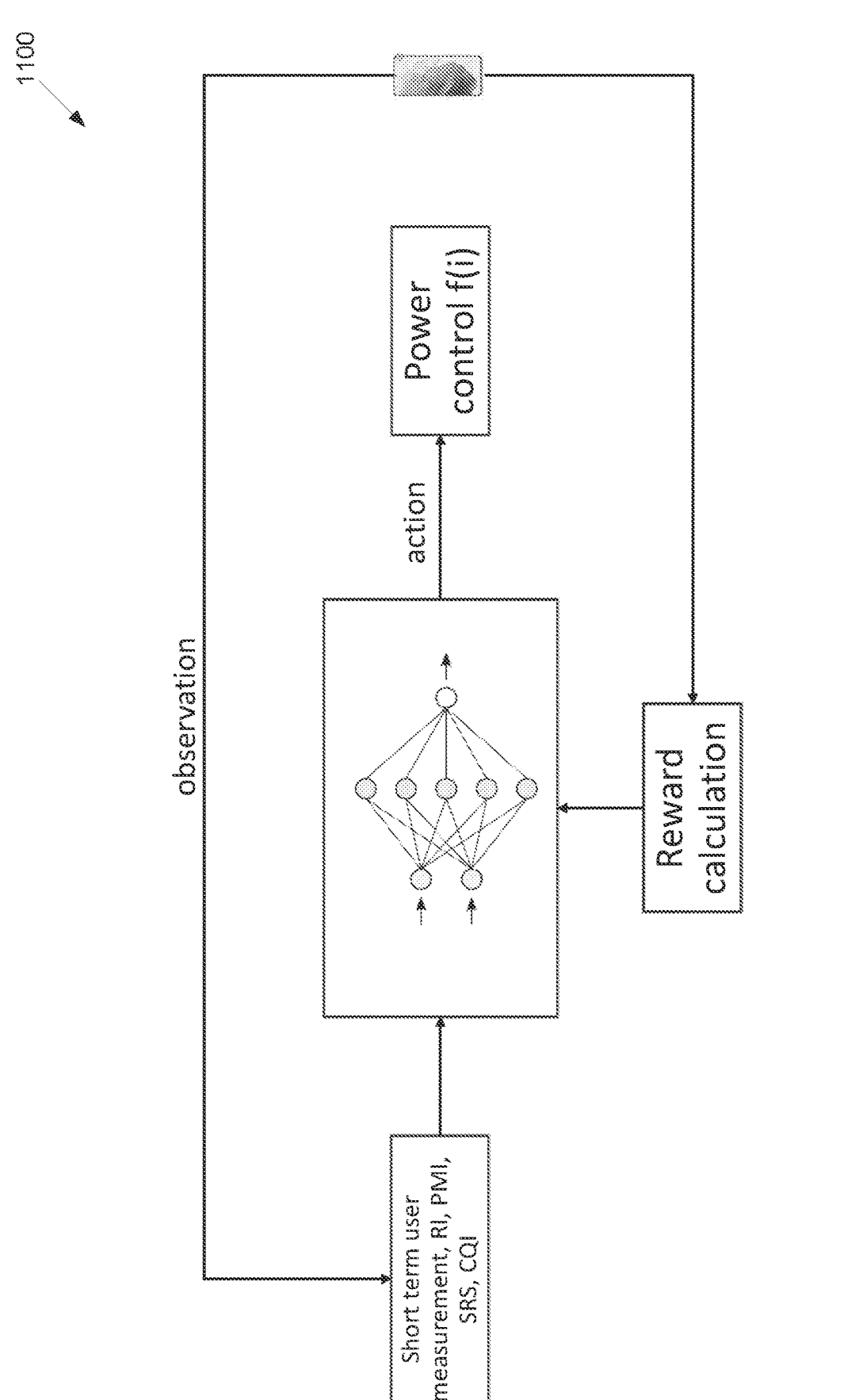
FIG. 11 illustrates an example of closed loop power control according to embodiments of the present disclosure.

FIG. 11 illustrates an example of closed loop power control 1100 according to embodiments of the present disclosure. An embodiment of the closed loop power control 1100 shown in FIG. 11 is for illustration only.

As illustrated in FIG. 11, a neural network is used to control the close loop power control. As illustrated in FIG. 11, the closed loop power control includes the short term use measurement (e.g., RI, PMI, SRS, and CQI) block receiving information from a user terminal. The closed loop power control includes the reward calculation block receiving information from the user terminal. The output of the short term user measurement block and the reward calculation block are sent to a neural network. After calculating the input from these blocks at the neural network, the neural network provides the output to a power control block.

Figure 12:
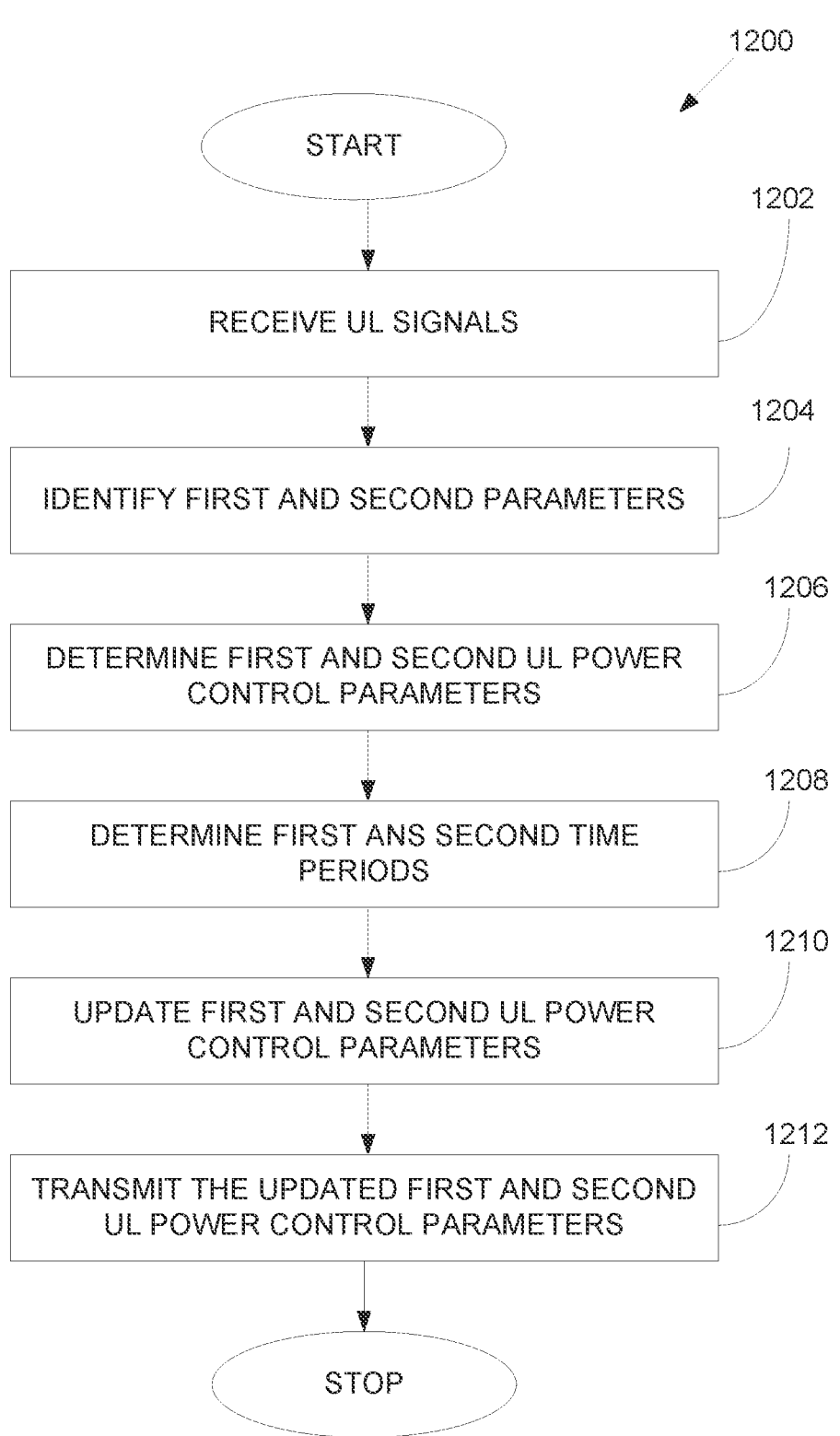
FIG. 12 illustrates a flowchart of method for VoLTE/VoNR performance improvement according to embodiments of the present disclosure.

FIG. 12 illustrates a flowchart of method 1200 for VoLTE/VoNR performance improvement according to embodiments of the present disclosure. The method 1200 as may be performed by a BS (e.g., 101-103 as illustrated in FIG. 1). An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As illustrated in FIG. 12, a method begins at step 1202. In step 1202, the BS receives, from a UE, UL signals.

Subsequently, in step 1204, the BS identifies, based on the UL signals, a first and second parameters. In step 1204, the first parameter includes at least one of a RSRP, SINR, and a channel throughput. In one embodiment, the second parameter includes at least one of a RI, a PMI, a CQI, and an SRS. In one embodiment, the first UL power control parameter includes a Po_PUSCH and a pathloss correction factor ($\alpha$), and the second UL power control parameter includes information for a close loop portion of subframe-level power control (f(i)).

Subsequently, in step 1206, the BS determines first and second UL power control parameters based on the first and second parameters, respectively.

Subsequently, in step 1208, the BS determines a first time period for the first UL power control parameter and a second time period for the second UL power control parameter, wherein the first time period is longer than the second time period.

Next, in step 1210, the BS updates the first UL power control parameter based on the first time period and the second UL power control parameter based on the second time period.

Finally, in step 1212, the BS transmits, to the UE, the updated first and second UL power control parameters for an UL transmit power of the UE.

In one embodiment, the BS uses a first DRL algorithm to determine the first UL power control parameter and a second DRL algorithm to determine the second UL power control parameter.

In one embodiment, the BS identifies, based on the first parameter, the first UL power control parameter using the first DRL algorithm, the second parameter being an instantaneous rewarded parameter associated with the UE for the second time period and identifies, based om the first UL power control parameter and the second parameter, the second UL power control parameter using the second DRL algorithm, wherein the first parameter includes a long-term rewarded parameter associated with the UE for the first time period.

In one embodiment, the BS updates the first UL power control parameter using an objective function value given by:

$$O = \frac{MOS_{avg}}{C_{MOS}} - Rate_{rej} + \frac{UL\_SINR_{avg}}{C_{SINR}},$$

where: $MOS_{avg}$ is an average mean opinion source (MOS) value for each UE supporting a VoLTE capability, $C_{MOS}$ is a normalization factor for MOS, $Rate_{rej}$ is a VoLTE rejection rate, $UL\_SINR_{avg}$ is an average uplink SINR value for each UE supporting the VoLTE capability, and $C_{SINR}$ is a normalization factor for an SINR.

In one embodiment, the BS identifies the first UL power control parameter using a power control algorithm: initializes four points based on an initially decided range of the first UL power control parameter; identifies a best three points in a set among the four points; determines a centroid value of the set as a new parameter for the first UL power control parameter as a new search point; and identifies a number of searches based on a predetermined search number and a predetermined stopping condition.

In one embodiment, the BS, to identify the first UL power control parameter using a power control algorithm, initializes a default point as a starting parameter for the first UL power control parameter; identifies a search direction in which an objective value increases; randomly identifies a neighbor point when a direction is not identified for the objective value to increase; and continues a search operation until a stopping condition is satisfied with a predefined condition.

In one embodiment, the BS identifies the second UL power control parameter based on neural network processing of the second parameter and reward calculation information received from the UE; and transmits, to the UE, the second UL power control parameter.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) in a wireless communication system, the BS comprising:

a transceiver configured to receive, from a user equipment (UE), uplink (UL) signals; and a processor operably coupled to the transceiver, the processor configured to:

identify first and second parameters based on a measurement period of the UL signals, wherein the measurement period comprises a first time period and a second time period, determine, based on the first and second parameters, a first UL power control parameter corresponding to the first time period and a second UL power control parameter corresponding to the second time period, wherein the first time period is longer than the second time period, and update the first UL power control parameter based on the first time period and the second UL power control parameter based on the second time period, the first UL power control parameter being updated using an objective function value comprising a rejection rate of a service being served between the UE and the BS, and a normalization factor for a signal to interference and noise ratio (SINR) and a mean opinion source value (MOS) associated with UE capability, wherein the transceiver is further configured to transmit, to the UE, the updated first and second UL power control parameters for a UL transmit power of the UE.

2. The BS of claim 1, wherein:

the first parameter includes at least one of a reference signal received power (RSRP), the SINR, and a channel throughput;

the second parameter includes at least one of a rank indicator (RI), a precoding matrix indicator (PMI), a channel quality indicator (CQI), and a sounding reference signal (SRS);

the first UL power control parameter includes a power of physical uplink shared channel (Po_PUSCH) and a pathloss correction factor ($\alpha$); and the second UL power control parameter includes information for a close loop portion of subframe-level power control (f(i)).

3. The BS of claim 1, wherein the processor is further configured to use a first deep reinforcement learning (DRL) algorithm to determine the first UL power control parameter and a second DRL algorithm to determine the second UL power control parameter.

4. The BS of claim 3, wherein:

the first parameter includes a long-term rewarded parameter associated with the UE for the first time period; and the processor is further configured to identify, based on the first parameter, the first UL power control parameter using the first DRL algorithm.

5. The BS of claim 4, wherein:

the second parameter is an instantaneous rewarded parameter associated with the UE for the second time period; and the processor is further configured to identify, based om the first UL power control parameter and the second parameter, the second UL power control parameter using the second DRL algorithm.

6. The BS of claim 1, wherein the processor is further configured to update the first UL power control parameter using the objective function value given by:

$$O = \frac{MOS_{avg}}{C_{MOS}} - Rate_{rej} + \frac{UL\_SINR_{avg}}{C_{SINR}},$$

where:

$MOS_{avg}$ is an average mean opinion source (MOS) value for each UE supporting a voice over long-term evolution (VoLTE) capability, $C_{MOS}$ is a normalization factor for MOS, $Rate_{rej}$ is a VoLTE rejection rate, $UL\_SINR_{avg}$ is an average uplink SINR value for each UE supporting the VoLTE capability, and $C_{SINR}$ is the normalization factor for the SINR.

7. The BS of claim 1, wherein, to identify the first UL power control parameter, the processor is further configured to use a power control algorithm to:

initialize four points based on an initially decided range of the first UL power control parameter;

identify best three points in a set among the four points;

determine a centroid value of the set as a new parameter for the first UL power control parameter as a new search point; and identify a number of searches based on a predetermined search number and a predetermined stopping condition.

8. The BS of claim 1, wherein, to identify the first UL power control parameter, the processor is further configured to use a power control algorithm to:

initialize a default point as a starting parameter for the first UL power control parameter;

identify a search direction in which an objective value increases;

randomly identify a neighbor point when a direction is not identified for the objective value to increase; and continue a search operation until a stopping condition is satisfied with a predefined condition.

9. The BS of claim 1, wherein:

the processor is further configured to identify the second UL power control parameter based on neural network processing of the second parameter and reward calculation information received from the UE; and the transceiver is further configured to transmit, to the UE, the second UL power control parameter.

10. A method of base station (BS) in a wireless communication system, the method comprising:

receiving, from a user equipment (UE), uplink (UL) signals;

identifying first and second parameters based on a measurement period of the UL signals, wherein the measurement period comprises a first time period and a second time period;

determining, based on the first and second parameters, a first UL power control parameter corresponding to the first time period and a second UL power control parameter corresponding to the second time period, wherein the first time period is longer than the second time period;

updating the first UL power control parameter based on the first time period and the second UL power control parameter based on the second time period, wherein the first UL power control parameter is updated using an objective function value comprising a rejection rate of a service being served between the UE and the BS, and a normalization factor for a signal to interference and noise ratio (SINR) and a mean opinion source value (MOS) associated with UE capability; and transmitting, to the UE, the updated first and second UL power control parameters for a UL transmit power of the UE.

11. The method of claim 10, wherein:

the first parameter includes at least one of a reference signal received power (RSRP), the SINR, and a channel throughput;

the second parameter includes at least one of a rank indicator (RI), a precoding matrix indicator (PMI), a channel quality indicator (CQI), and a sounding reference signal (SRS);

the first UL power control parameter includes a power of physical uplink shared channel (Po_PUSCH) and a pathloss correction factor ($\alpha$); and the second UL power control parameter includes information for a close loop portion of subframe-level power control (f(i)).

12. The method of claim 10, further comprising using a first deep reinforcement learning (DRL) algorithm to determine the first UL power control parameter and a second DRL algorithm to determine the second UL power control parameter.

13. The method of claim 12, further comprising:

identifying, based on the first parameter, the first UL power control parameter using the first DRL algorithm, wherein the first parameter includes a long-term rewarded parameter associated with the UE for the first time period.

14. The method of claim 13, further comprising:

identifying, based on the first UL power control parameter and the second parameter, the second UL power control parameter using the second DRL algorithm, wherein the second parameter is an instantaneous rewarded parameter associated with the UE for the second time period.

15. The method of claim 10, further comprising updating the first UL power control parameter using the objective function value given by:

$$O = \frac{MOS_{avg}}{C_{MOS}} - Rate_{rej} + \frac{UL\_SINR_{avg}}{C_{SINR}},$$

where:

$MOS_{avg}$ is an average mean opinion source (MOS) value for each UE supporting a voice over long-term evolution (VoLTE) capability, $C_{MOS}$ is a normalization factor for MOS, $Rate_{rej}$ is a VoLTE rejection rate, $UL\_SINR_{avg}$ is an average uplink SINR value for each UE supporting the VoLTE capability, and $C_{SINR}$ is the normalization factor for the SINR.

16. The method of claim 10, further comprising, for identifying the first UL power control parameter using a power control algorithm:

initializing four points based on an initially decided range of the first UL power control parameter;

identifying best three points in a set among the four points;

determining a centroid value of the set as a new parameter for the first UL power control parameter as a new search point; and identifying a number of searches based on a predetermined search number and a predetermined stopping condition.

17. The method of claim 10, further comprising, to identify the first UL power control parameter using a power control algorithm:

initializing a default point as a starting parameter for the first UL power control parameter;

identifying a search direction in which an objective value increases;

randomly identifying a neighbor point when a direction is not identified for the objective value to increase; and continuing a search operation until a stopping condition is satisfied with a predefined condition.

18. The method of claim 10, further comprising:

identifying the second UL power control parameter based on neural network processing of the second parameter and reward calculation information received from the UE; and transmitting, to the UE, the second UL power control parameter.

19. A non-transitory computer-readable medium comprising program code, that when executed by at least one processor, causes an electronic device to:

identify first and second parameters based on a measurement period of received uplink (UL) signals, wherein the measurement period comprises a first time period and a second time period;

determine, based on the first and second parameters, a first UL power control parameter corresponding to the first time period and a second UL power control parameter corresponding to the second time period, wherein the first time period is longer than the second time period;

update the first UL power control parameter based on the first time period and the second UL power control parameter based on the second time period, wherein the first UL power control parameter is updated using an objective function value comprising a rejection rate of a service being served between a user equipment (UE) and a base station, and a normalization factor for a signal to interference and noise ratio (SINR) and a mean opinion source value (MOS) associated with UE capability; and transmit, the UE, the updated first and second UL power control parameters for a UL transmit power of the UE.

20. The non-transitory computer-readable medium of claim 19, wherein:

the first parameter includes at least one of a reference signal received power (RSRP), the SINR, and a channel throughput;

the second parameter includes at least one of a rank indicator (RI), a precoding matrix indicator (PMI), a channel quality indicator (CQI), and a sounding reference signal (SRS);

the first UL power control parameter includes a power of physical uplink shared channel (Po_PUSCH) and a pathloss correction factor ($\alpha$); and the second UL power control parameter includes information for a close loop portion of subframe-level power control (f(i)).

\* \* \* \* \*